US005953170A

United States Patent [19]

Glancy

[11] Patent Number: 5,953,170

[45] Date of Patent: Sep. 14, 1999

[54] LABEL FOR CONTAINER

[75] Inventor: Peter A. Glancy, London, United Kingdom

[73] Assignee: Penalty Kick Management Ltd., London, United Kingdom

[21] Appl. No.: 08/671,262

[22] Filed: Jun. 26, 1996

[51] Int. Cl.[6] .............................. G02B 5/00; B42D 15/00; G09F 3/00; G09C 3/00

[52] U.S. Cl. .............................. 359/896; 283/72; 283/73; 40/310; 380/54

[58] Field of Search .................................... 359/618, 462, 359/465, 464; 40/310, 299, 311; 283/72, 73, 56; 380/54

[56] References Cited

U.S. PATENT DOCUMENTS

| | | | |
|---|---|---|---|
| 1,982,282 | 11/1934 | Bock . | |
| 2,305,890 | 12/1942 | Moore . | |
| 2,810,978 | 10/1957 | Chapman . | |
| 3,874,977 | 4/1975 | Pyles | 161/3 |
| 4,023,911 | 5/1977 | Julesz et al. | 359/465 |
| 4,115,939 | 9/1978 | Marks | 40/310 |
| 4,505,497 | 3/1985 | Katzman | 283/81 |
| 5,350,612 | 9/1994 | Stern et al. | 428/40 |
| 5,371,627 | 12/1994 | Baccei et al. | 359/462 |
| 5,419,592 | 5/1995 | Stuart | 283/102 |
| 5,439,721 | 8/1995 | Pedroli et al. | 428/42.1 |
| 5,494,945 | 2/1996 | Sekiguchi et al. | 434/365 |

FOREIGN PATENT DOCUMENTS

| | | |
|---|---|---|
| 380 869 | 9/1932 | United Kingdom . |
| 2 192 082 | 12/1987 | United Kingdom . |
| WO 93/09525 | 5/1993 | WIPO . |

*Primary Examiner*—Cassandra Spyrou
*Assistant Examiner*—Audrey Chang
*Attorney, Agent, or Firm*—Frommer Lawrence & Haug LLP; William S. Frommer

[57] ABSTRACT

A label for a container which is at least partially translucent, an image bearing portion located on part of the label with the image bearing portion including an image which is in a visually incoherent form, and a viewing member located on another part of the label for rendering the image in a visually coherent form when the image is viewed through the viewing member. The image or message provided on said image bearing portion can be optically encoded so as not to be intelligible except when viewed through the viewing member, such as a decoding window. Encoding/decoding techniques which can be utilized include, but are not limited to, lenticular indicia and hologram indicia, both of which are decoded by using techniques “matched” to the encoding technique. The label may be integrally formed on, for example, a box-type container.

10 Claims, 2 Drawing Sheets

LABEL FOR CONTAINER

FIELD OF THE INVENTION

The present invention relates to a label for a container, and more specifically, to such a label including a visually incoherent image or message and a viewing member for rendering the image in a visually coherent form which are both affixed to the container. The invention also relates to a container having said label formed integrally therewith.

BACKGROUND OF THE INVENTION

Clear or tinted glass or plastic containers normally have labels or printed pigments affixed to their external surfaces in order to convey relevant manufacturer, brand and contents information. For promotional purposes, it has been found that additional labelling or artwork may be desirable.

Promotional opportunities where extra novelty or eye appeal to be conveyed or where, for example, there is an "instant win" opportunity, require traditional forms of concealment for security reasons which may be, for example, rub-off coatings, a factory sealed element or security tape. However, in the past, these attempts to promote a product have been disadvantageous as failing to provide a secure manner of concealing the game prize which could be read or tampered with without revealing an intrusion or violation of the container.

Moreover, these promotions have sometimes not led to the consumer utilizing the product so as to capture future sales of the product without the promotion.

OBJECTS OF THE INVENTION

It is thus an object of the present invention to provide a label for a container which overcomes the above-noted disadvantages of the prior art.

It is another object of the present invention to provide a container with labeled or over-printed surfaces which provides a creative sales, value-added promotional element.

It is a further object of the present invention to provide a label for a container which has a secure manner of concealing an image, such as a game prize, which cannot be read or tampered with without revealing an intrusion or violation of the container.

Yet another object of the present invention is to provide a container having a promotional element which encourages the consumer to purchase the product that is housed in the container.

It is yet another object of the present invention to provide a container having a label formed integrally therewith wherein after a sufficient amount of the product in the container has been utilized or consumed, a clear optical path is provided so that a visually incoherent message or image which is affixed to the container can be deciphered or decoded by a viewing member also affixed to the container but opposite to the message or image.

Various other objects, advantages and features of the present invention will become readily apparent from the ensuing detailed description and the novel features will be particularly pointed out in the appended claims.

SUMMARY OF THE INVENTION

The present invention seeks to provide a creative sales, value added or promotional element to a container with labelled or over-printed surfaces. In addition, the container of the present invention also provides a secure manner of concealing a visually incoherent image or message which cannot be read or tampered with without revealing an intrusion or violation of the container. Moreover, as a result of the design of this label, the consumer is encouraged to buy the container product and then use or consume a sufficient amount of that product so that a clear optical path is provided between the visually incoherent image or message and a viewing member which allows the image or message, such as a game prize message, to be read in a coherent form. Therefore, since the consumer must use or consume a certain amount of the product before being able to read the image or message, future sales of the container product without the promotion are encouraged.

According to one aspect of this invention, a container, such as a bottle, a cardboard box, a blister pack, a window box etc., which is at least in part translucent, includes a preferably non-embossed image bearing portion having an image or message which is in a visually incoherent form and a viewing member for rendering the image in a visually coherent form.

Advantageously, the image provided on the image bearing portion can include written text or graphics.

In the preferred embodiment, the image bearing portion and the viewing member are located on different parts of a label assembly adapted to be affixed to the container. Alternatively, the image bearing portion and the viewing member can be formed directly on the container, that is, the label assembly may be formed integrally with the container. In either arrangement, preferably, the viewing member is, in use, provided on an opposite side of the container from the image bearing portion.

More specifically, in the label or container of the present invention, the viewing member is at least one "window" formed in the label assembly which is affixed to the container. When the label assembly is applied to a bottle-type container in a generally arcuate form, the window is disposed approximately 180° from the image bearing portion such that an image or message provided on the rear surface of the label in a visually incoherent form can be viewed through the "window". The indicia preferably is optically encoded so as not to be intelligible except when viewed through a "decoding" window, such as a random dot hidden image encoding/decoding technique. Other types of encoding/decoding techniques also are contemplated, such as lenticular indicia (which are decoded by a suitable lenticular screen), hologram indicia (such as foil hologram), autostereogram, 3-D lenticular, moving 3-D lenticular, and polarization. All of these encoding techniques are readily decoded using decoding techniques for the viewing member matched thereto, such as clear windows, tinted windows, polarized tinted windows, etc.

In addition, the image can be a heat sensitive paint/ink/varnish image, in which event the image is heated by, for example, body temperature, to render the image coherent and the image is then read through a clear window; or the image may be read by any of the above-mentioned decoding techniques in which event it will be read as indicated above. Using this technique, the image also can initially be obscured by heat sensitive ink or paint.

According to another aspect of this invention, a method of reading the image on the container is provided wherein the container initially contains contents, such as fluids, obliterating the image, the method including the steps of emptying the contents until the message can be viewed and viewing the message through the viewing member.

As a result thereof, the present invention utilizes the opacity of the container's contents to block or conceal the image and includes a distortion or scrambling of the image so that the image is only viewable when the contents are suitably removed or consumed and the image is viewed through the image bearing portion or window provided in the side of the container.

Based upon the foregoing, the present invention enables creative sales, value added or promotional features to be added to a translucent container with labelled or over-printed surfaces or window box or blister-carded products, thereby permitting two-dimensional and stereoscopic images to be viewed, for example. This container also provides for a secure method of concealing a game prize which cannot be read or tampered with without revealing an intrusion or violation of the container. The container of the present invention also presents a means of utilizing a normally redundant waste container for longer term use and enjoyment. In addition, this container can assist in providing a manner of visually conveying instructive data on medical, food, automotive, gardening and D.I.Y products.

BRIEF DESCRIPTION OF THE DRAWINGS

The foregoing detailed description, given by way of example, will best be understood in conjunction with the accompanying drawings in which.

DETAILED DESCRIPTION OF CERTAIN PREFERRED EMBODIMENTS

Figure 1:
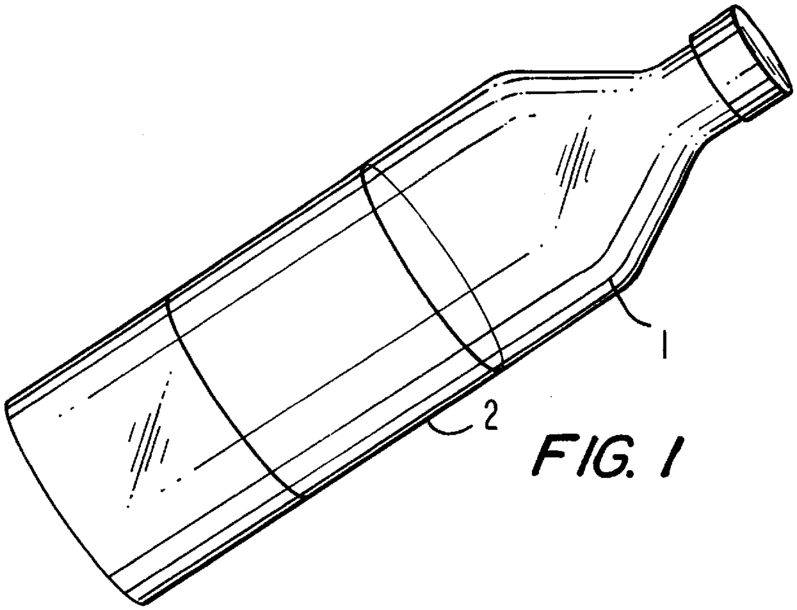
FIG. 1 is a front elevational view of a preferred embodiment of a container in accordance with the teachings of the present invention.
Figure 2:
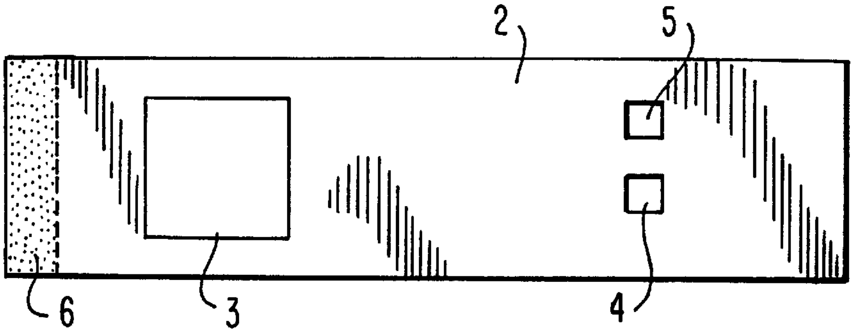
FIG. 2 is a front elevational view of a label assembly in developed plan-form, utilized on the container of FIG. 1.
Figure 3:
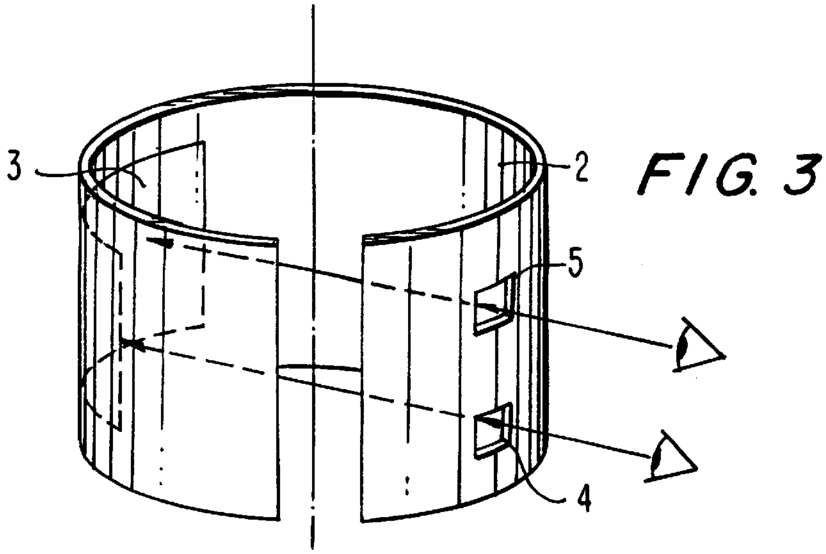
FIG. 3 is a front perspective view illustrating the label assembly of FIG. 2 in an in-use, arcuate, form such that the image bearing portion can be viewed through the viewing member thereof.

Referring now to FIGS. 1–3, wherein like reference numerals designate like parts in the several views, a translucent container 1 having a generally circular cross-section is shown. The term "translucent" used herein includes containers which are transparent or have a portion thereof which is transparent. Suitable packaging for the container 1 includes bottles, cardboard boxes, blister packs, window boxes, etc.

As shown in FIG. 1, a label assembly 2 is wrapped around the circumference of the container 1 and is affixed thereto in an arcuate form so that the label assembly partially extends along the axial length of the container 1. The label assembly 2, particularly shown in FIGS. 2 and 3, includes a non-embossed image bearing portion 3 affixed to the surface of the container 1 and facing inward of the container, as best seen in FIG. 3. The image bearing portion 3 includes an image or message in a visually incoherent form which can be viewed in a readable form when decoded through at least one viewing member of the label assembly, such as the windows 4 and 5, which, in assembled form, are on the opposite side of the container from the image bearing portion 3. Preferably, when the label assembly 2 is affixed to the container 1, in its arcuate form, as shown in FIGS. 1 and 3., the image bearing portion 3 is positioned approximately 180° from the viewing member(s) 4 and 5. An end of the label assembly has an adhesive strip portion 6 for securing the label to the container. In the preferred embodiment, the image or message of the image bearing portion 3 can be pre-printed on the rear side of the label assembly 2 or pre-printed on the inner surface of the container 1.

Although two windows are illustrated in FIGS. 2–3 as the viewing member, only one window or more than two windows may be employed. Further, instead of employing a label assembly, the image, as aforementioned, may be pre-printed onto the container and the window or windows of the viewing member may be formed on opposing portions of the container wall. In this respect, the windows of the viewing member may be cut-outs or unprinted areas provided on the containers.

Figure 4:
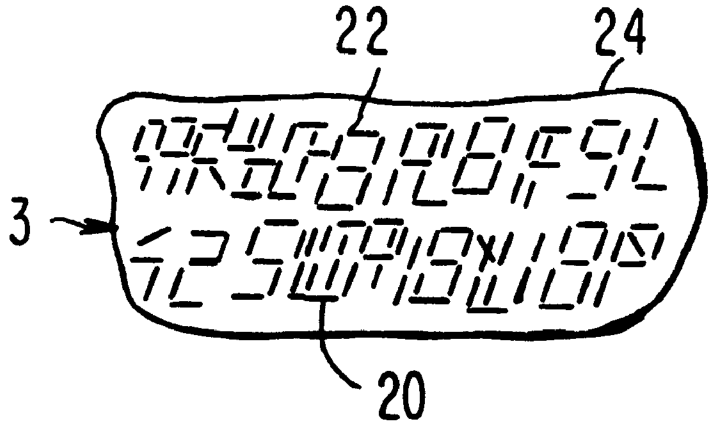
FIG. 4 illustrates a random dot hidden image in a visually incoherent form provided on the image bearing portion of the label assembly of FIG. 3.
Figure 5:
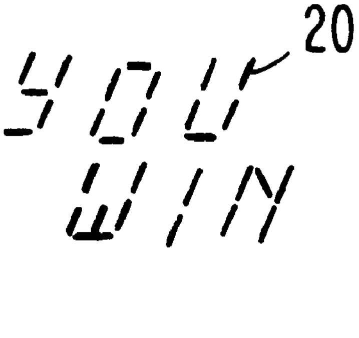
FIG. 5 illustrates the random dot hidden image of FIG. 4 in a readable form as viewed through a suitable viewing member, as shown in FIG. 3.

To prevent the image from being properly read (i.e. making the image incoherent from the outside when the image is not obstructed or obliterated by the contents in the container), the image is advantageously encoded or scrambled by adopting one of the following techniques:

(a) Random Dot Hidden Image—As is shown in FIG. 4, the image of the image bearing portion can be a random dot hidden image and the viewing member can include one or more tinted windows through which the random dot hidden image can be read. More specifically, with respect to this technique, a main image or message 20 to be revealed is compiled and distorted as a series of specially prepared dots or shapes 22 to be reproduced in a particular color of ink. These images are distorted by means of a computer software program known to those of ordinary skill in the art. In addition, the inks utilized to form the dots and shapes are formulated by a process requiring generation in matching of the inks on both the image and the window/filter areas of the viewing member which results in the desired random dot hidden image 20. Further, mixed amongst and overlaid upon this main image are at least one or two other dot shapes 24 which form the majority of the apparent overall color image affect presented to the naked eye.

In order to view the random dot hidden image 20, the window is a colored filter, with the color chosen dependent upon both the main image 20 and background colors 24. For example, when viewed through a red window (viewing an overall image composed of degrees/hues of red, blue and yellow), red and yellow colors recede in intensity leaving an apparently darkened blue image in a more obvious form. This technique can be similarly controlled and manipulated on other forms by choosing encoding colors and decoding colors which maximize the effect by selecting them from opposite sides of a color wheel.

(b) Random Dot Hidden Stereogram—This technique is similar to that used in viewing a random dot hidden image as discussed above, but permits a 3-dimensional image to be revealed. In this technique, a 3-dimensional picture is taken and then, through the utilization of a suitable computer software program known to those of ordinary skill in the art, the 3-dimensional picture is directed into a series of dots/shapes which are scrambled when output. An overall background effect, similar to the scrambled image, is included in order to render the image to be viewed within the panel in a visually incoherent form. The effect/image may be a combination of blue/red "dots", green/red "dots" or another combination that produces the best 3-dimensional effect and clarity. With this technique, a compatible viewing member is formed of one or more windows containing two colored viewing areas; red/blue or red/green, etc.

When viewed stereoscopically through these windows, the 3-D image is seen to form against the background. For instance, the image can be solid shapes, numerals or letters.

(c) 3-Dimensional stereogram—This technique is similar to that used in viewing a random dot hidden stereogram as discussed above, but whereas the random dot hidden stereogram is generated in a scrambled dot/shape format, the 3-dimensional stereogram is generated by individually colored shifted elements which are only re-combined and unscrambled when viewed stereoscopically through a viewing member formed of a two-colored window.

In the 3-dimensional stereogram technique, inks used for the production of the image must be compatible with colors/refractive indices of the windows. Typically, the scrambled image in this technique is red/green with the decoding window(s) being red/green or red/blue.

(d) Moving 3-Dimensional Lenticular Array—By computer "slicing" a series of framed pictures (taken from a film sequence), each frame is effectively split into thin slivers of information. This technique utilizes a print system capable of reproducing detail at least equivalent to 600 dots-per-inch, which is well within the operating ability of commercially available printers. From each frame of slivers, individual slivers are selected. When combined with selected slivers from other frames, the slivers re-form to complete a single frame, although predominantly unrecognizable as a coherent image. In order to decipher that image, the image is viewed through a viewing member formed of a lens/window composed of a plurality of triangular prisms whose axes extend in the same direction as the slivers. By tilting the prismatic lenses above the image, as by tilting the container, the image is seen as a complete, moving image.

(e) Lenticular Image—This technique is similar to that used in viewing a 3-dimensional lenticular array as discussed above, but utilizes fewer images where the effect revealed shows simply one image then another (i.e., a predominantly static, main image with only part of the main image appearing fixed in one position, then fixed in another). When the image is viewed through a triangular prismed lens/window to decipher it, the image appears to move between positions.

(f) Autostereogram—In the autostereogram technique, the image of the image bearing portion is an autostereogram and the viewing member is formed of one or more clear windows through which the autostereogram can be read.

(g) Foil Hologram—Another technique which is contemplated for use with the present invention utilizes a foil hologram for the image of the image bearing portion. The foil hologram can be read by a viewing member formed of one or more tinted windows.

(h) Polarized Image—In this technique, the image of the image bearing portion is a polarized image and the viewing member thus includes one or more tinted polarized windows through which the polarized image can be read.

(i) Neat Sensitive Paint/Ink/Varnish Image—In this technique, the image is heated by, for example, body temperature, to render the image coherent and the image is then read through a clear window(s) or the image can be formed by and read by one of the imaging techniques set forth above and decoded by means of the corresponding viewing member for that imaging technique.

The image bearing portion 3 may include written text and/or graphics. The image is such that it can normally only be read when the contents of the container which, when the container is full will obliterate the image, are emptied to such an extent that the image is viewable through the viewing member or windows 4 and 5 on the opposing side of the container. In one preferred embodiment, the contents of the container are a fluid.

In another preferred embodiment, the label assembly is integrally formed with the container. For example, the container is opaque (such as a box—e.g., a cereal box, a snack food box, etc.) and a portion of the container wall is clear, for example, by providing a window box such that a user can view the image on the opposing wall of the container through the window box. In a further preferred embodiment, instead of using a window box, or boxes, the container may be a blister-carded package (i.e., a container which is formed by a backing card against which an article is located and the article is held to the card by a plastics film, whereby the article sits in a bubble in the plastic film). It is thus to be understood that the term "container" used herein includes the use of packaging in general.

Other techniques exist allowing an individual to view through a window into the reverse area of the container's label. However, none use a viewing member, such as the window described herein, as a decoding device to unscramble a coded image which is viewed through it.

The compatibility of the tonal values in the image-inks and window colors is pre-determined and maintained in final reproduction. A suitable software program is used to computer-scramble the images so that, when outputted, they are in a form which maximizes the main image's concealment.

In this manner, the viewing techniques employed herein can be utilized on any see-through material that can be colored, printed or distorted into lens formations.

Uses range from solid containers which are opaque/semi-opaque, or semi-rigid containers like plastic boxes and blister cards, flexible containers and wrappings such as plastic bags and heat-shrink materials.

Therefore, a container label has been designed which provides a creative sales, value added or promotion element thereto. In addition, the label and container of the present invention provide a secure manner of concealing a visually incoherent image or message which cannot be read or tampered with without revealing an intrusion or violation of the container. Moreover, since the consumer must use or consume a certain amount of the product before being able to read the image or message, future sales of the product without the promotion are encouraged.

While the present invention has been particularly shown and described with reference to certain preferred embodiments, it will be readily apparent to those of ordinary skill in the art that various changes and modifications may be made therein without departing from the spirit and scope of the invention. It is intended that the appended claims be interpreted as including the foregoing as well as various other such changes and modifications.

What is claimed is:

1. A label for a beverage container having a housing for holding a product with said container housing being at least partially translucent, said label comprising:

a non-embossed image bearing portion which is substantially smooth and capable of contacting said container housing with said image bearing portion including an image which is in a visually incoherent form and wherein said image of said image bearing portion is a random dot hidden image which is compiled and distorted as a series of specially prepared dots or shapes to be reproduced in a particular color or ink; and viewing means located on another part of said label for rendering said image in a visually coherent form when said image is viewed through said viewing means and wherein said viewing means comprises at least one tinted window in the form of a colored filter through which said random image is read; and wherein said tinted window of said viewing means is in a hue of red and said image bearing portion is composed of hues of red, blue and yellow in the visually coded incoherent form so that the red and yellow hues recede in intensity to present said image in the visually coherent decoded form in a hue of blue.

2. The label as claimed in claim 1 wherein said image bearing portion and said viewing means are located on different parts of said label adapted to be affixed to said container housing.

3. The label as claimed in claim 1 formed integrally with said container wherein said viewing means is, in use, provided on an opposite side of said container housing from said image bearing portion.

4. The label as claimed in claim 1 wherein said image bearing portion and said viewing means are formed directly on said container housing.

5. The label as claimed in claim 1 wherein said image of said image bearing portion includes written text and/or graphics.

6. A combination container/label for decoding an image provided on label indicia on a beverage container, said combination container/label assembly comprising:

a beverage container for holding a liquid with said container being at least partially translucent; and label indicia on said container including a non-embossed image bearing portion having an image which is in a visually coded incoherent form and wherein said image of said image bearing portion is a random dot hidden image which is compiled and distorted as a series of specially prepared dots or shapes to be reproduced in a particular color or ink, said label indicia further including viewing means for rendering said image in a visually coherent decoded form and wherein said viewing means comprises at least one tinted window in the form of a colored filter through which said image is read; and wherein said tinted window of said viewing means is in a hue of red and said image bearing portion is composed of hues of red, blue and yellow in the visually coded incoherent form so that the red and yellow hues recede in intensity to present said image in the visually coherent decoded form in a hue of blue.

7. The combination container/label assembly of claim 6 wherein said container has a substantially opaque outer surface.

8. The combination container/label assembly of claim 6 wherein said container is a bottle.

9. A label for affixation to a beverage container and for reading an image or message which is in a visually incoherent form, said label assembly comprising:

a non-embossed image bearing portion including said image which is in a visually incoherent form and wherein said image of said image bearing portion is a random dot hidden image which is compiled and distorted as a series of specially prepared dots or shapes to be reproduced in a particular color or ink;

viewing means for rendering said image in a visually coherent form when said image is viewed therethrough and wherein said viewing means comprises at least one tinted window in the form of a colored filter through which said image is read; and wherein said tinted window of said viewing means is in a hue of red and said image bearing portion is composed of hues of red, blue and yellow in the visually coded incoherent form so that the red and yellow hues recede in intensity to present said image in the visually coherent decoded form in a hue of blue.

10. A combination container/label assembly for decoding an image provided on a label assembly for decoding an image provided on a label assembly affixed to a beverage container, said combination container/label assembly comprising:

a beverage container for holding a product with said container being at least partially translucent; and a label assembly affixed to said container including a non-embossed image bearing portion having an image which is in a visually coded incoherent form and wherein said image of said image bearing portion is a random dot hidden image which is compiled and distorted as a series of specially prepared dots or shapes to be reproduced in a particular color or ink, said label assembly further including viewing means disposed approximately 180° from said image bearing portion for rendering said image in a visually coherent decoded form and wherein said viewing means comprises at least one tinted window in the form of a colored filter through which said image is read: and wherein said tinted window of said viewing means is in a hue of red and said image bearing portion is composed of hues or red, blue and yellow in the visually coded incoherent form so that the red and yellow hues recede in intensity to present said image in the visually coherent decoded form in a hue of blue.

* * * * *